Patented Apr. 22, 1930

1,755,424

UNITED STATES PATENT OFFICE

MONROE W. CARROLL, OF BEAUMONT, TEXAS

WELL-BORING APPARATUS

Application filed June 29, 1926. Serial No. 119,326.

This invention relates to new and useful improvements in a well boring apparatus.

One object of the invention is to provide a rotary drilling machine embodying a novel type of base for the master wheel, as well as a novelly formed, and novelly mounted master wheel on said base.

Another object of the invention is to provide a well boring apparatus having a base plate with a pipe receiving opening and an upstanding sleeve surrounding the opening and fixed to the base plate and forming a bearing around which the master wheel runs, said bearing preventing any side movement of the master wheel and confining it to rotation on a true vertical axis. This bearing sleeve also forms a fixed anchor for the pipe holding means used in making up or breaking out the pipe, so that the string of pipe in the well bore will be held stationary and will thus not injure or disrupt the walls of the bore, in breaking out and withdrawing the pipe, or drill stem, as will be hereinafter explained.

A further object of the invention is to provide an apparatus of the character described, equipped with means for sustaining the load of the pipe being handled, independent of the master wheel so as to relieve the master wheel bearings of any considerable load.

A further feature of the invention is to provide a novel means for manipulating the pipe holder relative to the base plate so as to release the holder from, or permit its engagement with the pipe to be handled.

A still further feature of the invention is to provide an apparatus of the character described of such form as to provide a lubricant retaining chamber in which the master wheel bearings and drive pinion are located, thus providing both for the lubrication of said bearings and the protection thereof against slush, grit and other deleterious foreign matter.

With the above and other objects in view this invention has particular relation to certain novel features of construction, operation and arrangement of parts, an example of which is given in this specification and illustrated in the accompanying drawings, wherein:—

Figure 1:
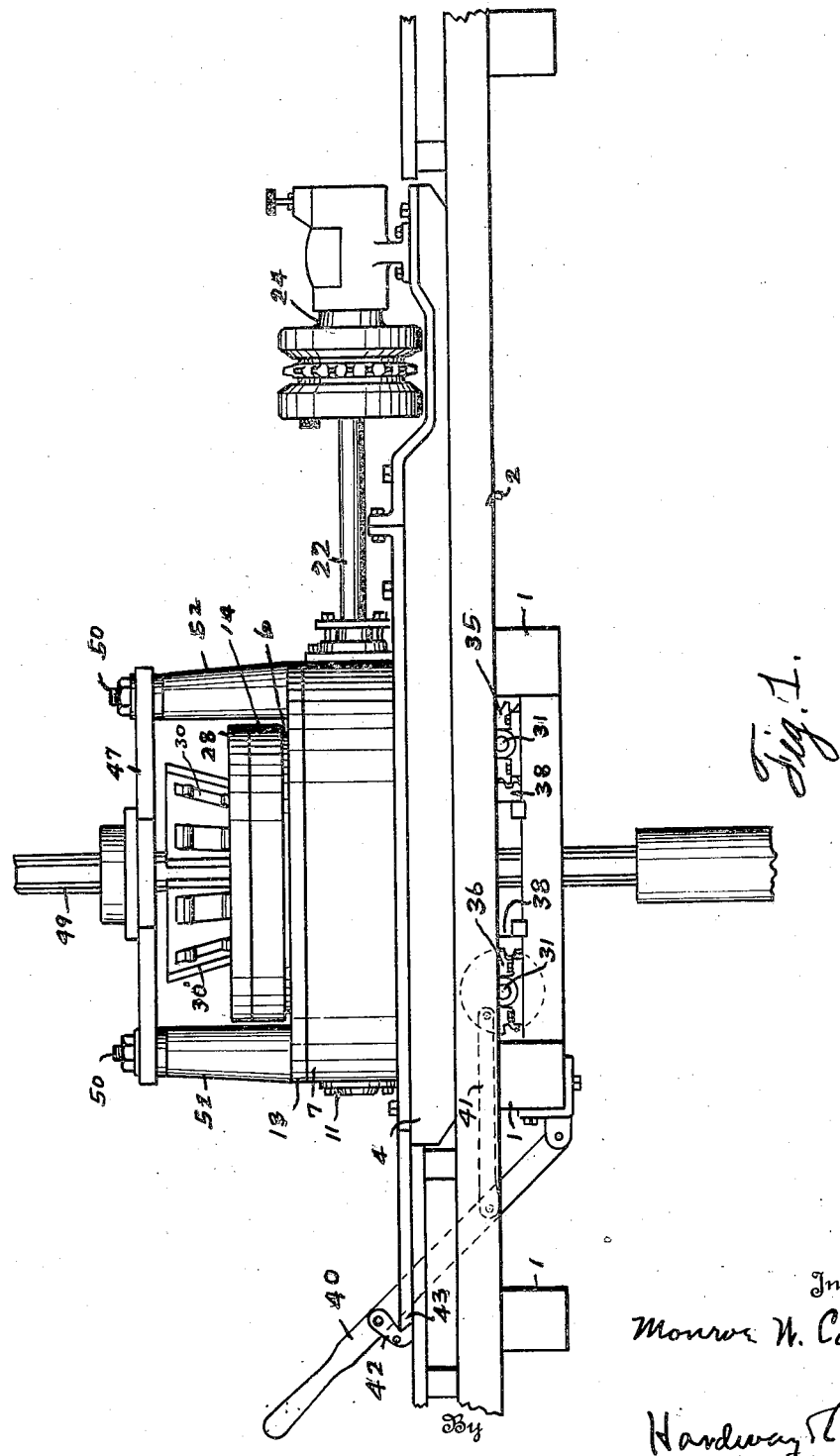
Figure 1 shows a side elevation of the complete apparatus, as mounted on a derrick floor.

Referring now more particularly to the drawings, wherein like numerals of reference designate similar parts in each of the figures the numerals 1, 1, designate the derrick sills on which there is mounted a floor supporting frame consisting of the lengthwise beams 2, 2, and the cross beams 3, 3, mounted thereon.

There is a base plate 4 mounted on this supporting frame having a central pipe opening 5 with an annular upstanding sleeve 6 around said opening. The base plate also has an annular, marginal, upstanding rim 7, spaced from the sleeve 6, thus forming an annular chamber 8 between them.

There are a plurality of radial bearing rods 9, spaced apart and spanning said chamber, with their inner ends journaled in the sleeve 6 and their outer ends screwed into inserts 10 fitted through the outer rim 7 and retained therein by retaining plates, as 11, bolted to the outer side of said outer rim. Rotatably mounted on these rods 9 are the inwardly beveled roller bearings 12 on which the annular master wheel 13 is mounted. This master wheel surrounds and has a bearing on the sleeve 6 and is retained in place by means of a ring nut 14 which is threaded onto the upper end of the sleeve 6. Interposed between the ring nut 14 and the wheel 13 are the anti-friction bearings 15 and surrounding said sleeve and interposed between it and the master wheel there are the anti-friction bearings 16. The ring nut 14 has an annular groove 17 on its under face into which projects the annular rib 18 formed on the upper side of the master wheel.

The master wheel 13 has an annular marginal groove 19, on its under side into which the upper edge of the rim 7 fits so as to completely enclose the chamber 8 and protect it from foreign matter.

The under side of the master wheel is formed with a bevel gear face 20 and in mesh therewith there is a beveled pinion 21 which is fixed on the inner end of the shaft 22 through which said wheel is driven. The inner end of this shaft is journaled in the sleeve 6 and the shaft works through the gland 23 in the rim 7, said pinion being located in the chamber 8.

The shaft 22 is the driven shaft of a transmission mechanism 24 employed to drive the rotary and fully described in my co-pending application for patent thereon, filed in the United States Patent Office on the 14th day of June 1926, under Serial No. 115,741.

The chamber 8 should be filled with a lubricant before the apparatus is assembled and the bearings 15 may be lubricated through the duct 25, which is normally closed by the plug 26.

Within the sleeve 6 there is a slip ring 27 whose upper end is formed with the outwardly extending annular flange 28, and which is formed with the downwardly converging walls 29. Pipe engaging slips 30 are mounted in cages 30' in the slip ring, said slip ring and slips constituting a pipe holder fully described in my copending application on a pipe holder, filed in the United States Patent Office on June 14, 1926, under Serial No. 115,742.

There is a mechanism for manipulating said slip cages which will now be described:—
Underneath the derrick floor there are the transverse shafts 31, 31, spaced apart and provided with the beveled pinions 32, 32, which are fixed thereon. These pinions are in mesh with similar pinions 33, 33, which are fixed on the respective ends of a common shaft 34. Fixed on the respective shafts 31 are the gear wheels 35, 36, which are in mesh with the respective rack faces 37, 37, of the lift bars 38, 38.

These bars work vertically through the bearings 39, 39, of the base plate 4.

There is a lever 40 pivoted at its lower end to one of the derrick sills 1 and this lever is connected to the gear 36, 36, through the reach rods 41. By the manipulation of said lever the gear 36 and its shaft 31 may be rotated in either direction desired and this will operate through the shaft 34 and the intermeshing bevel gears described to rotate the other shaft 31 and thereby the lift bars 38, 38, may be elevated or lowered. The bars 38 may be locked in elevated position, by engaging the latch 43 carried by the lever 40, over a catch 43 provided on the framework for this purpose. The lever 40 may be operated manually or by any mechanical means, suitable for the purpose.

Figure 2:
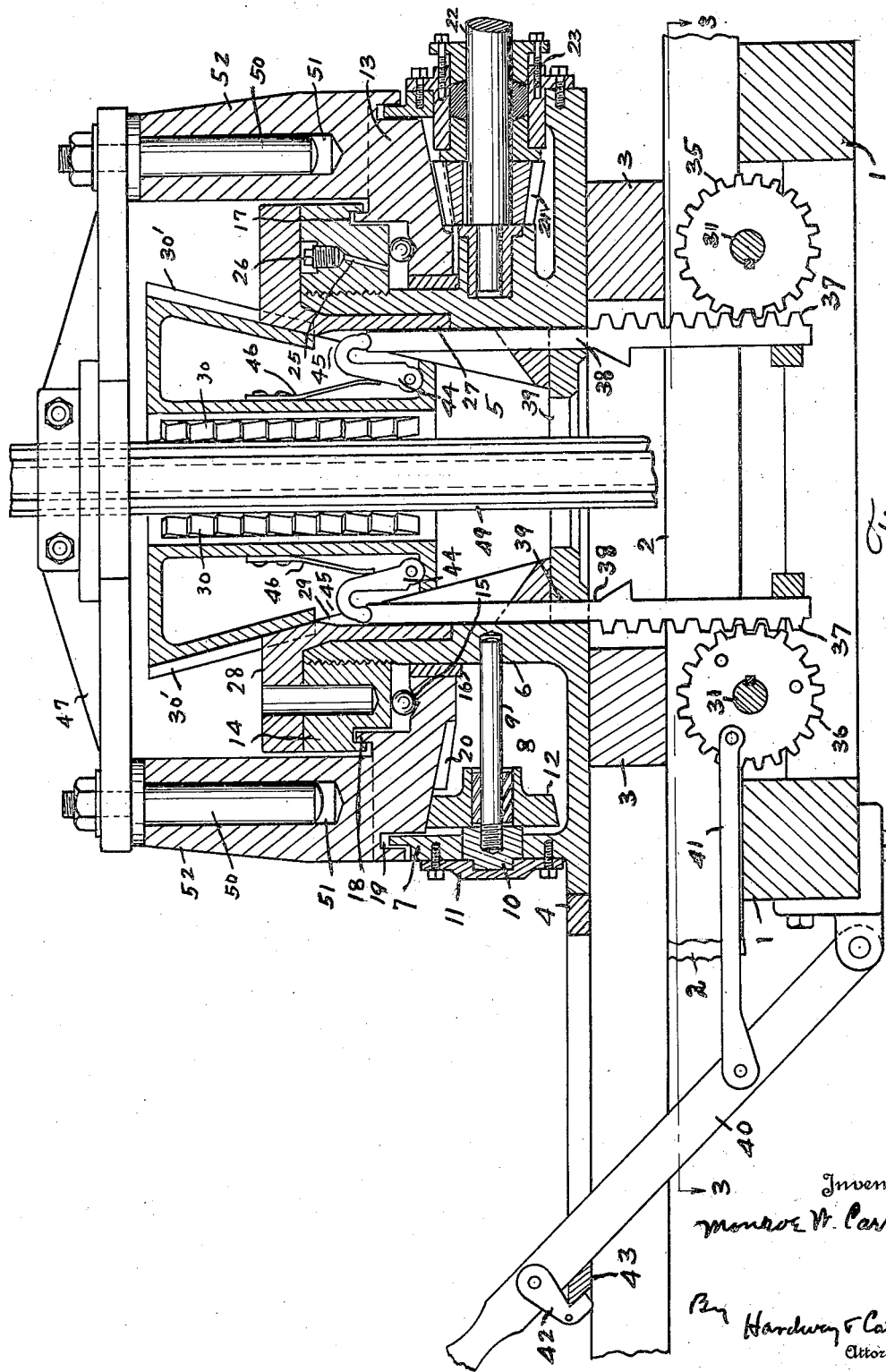
Figure 2 shows a vertical sectional view thereof.
Figure 3:
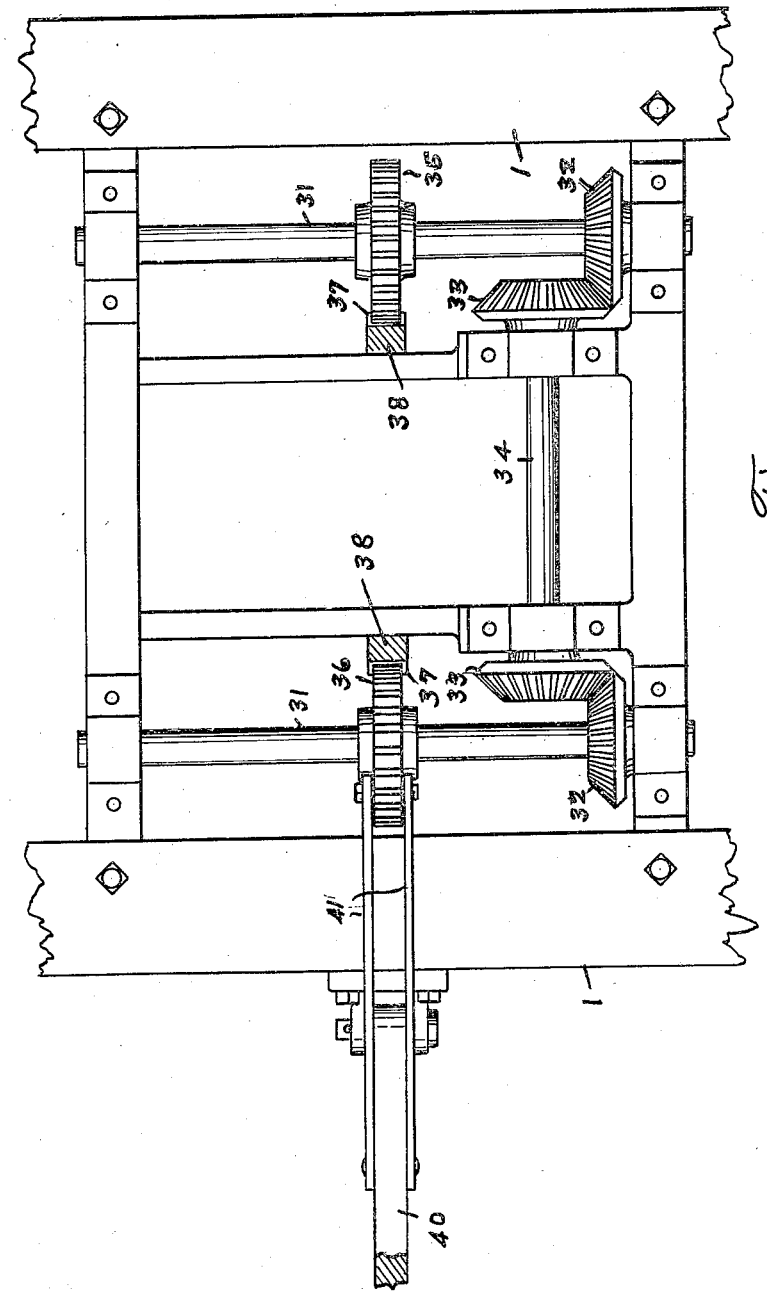
Figure 3 shows a horizontal sectional view of the manipulating apparatus for the pipe holder.
Figure 4:
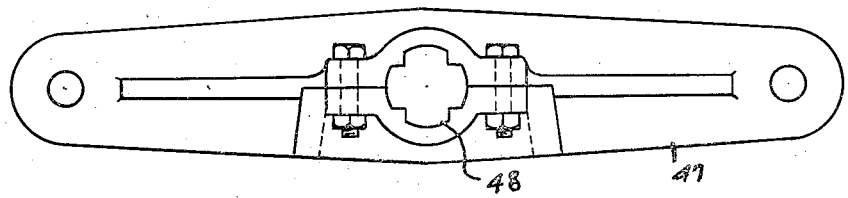
Figure 4 shows a plan view of a pipe rotating yoke employed for engaging the conventional type of grief stem.
Figure 5:
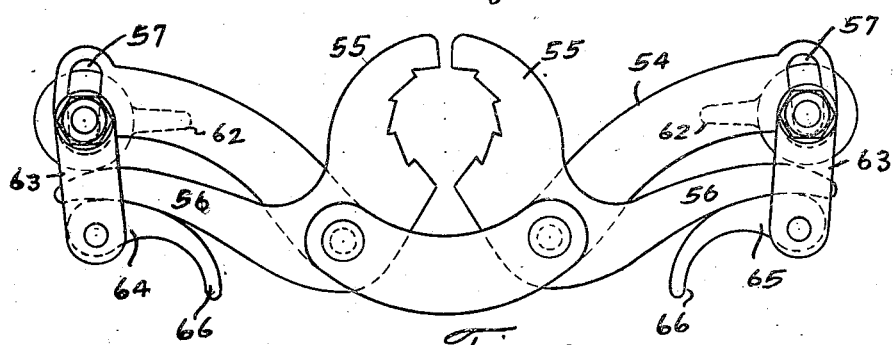
Figure 5 shows a plan view of another type of yoke which may be used for engaging round pipe.
Figure 6:
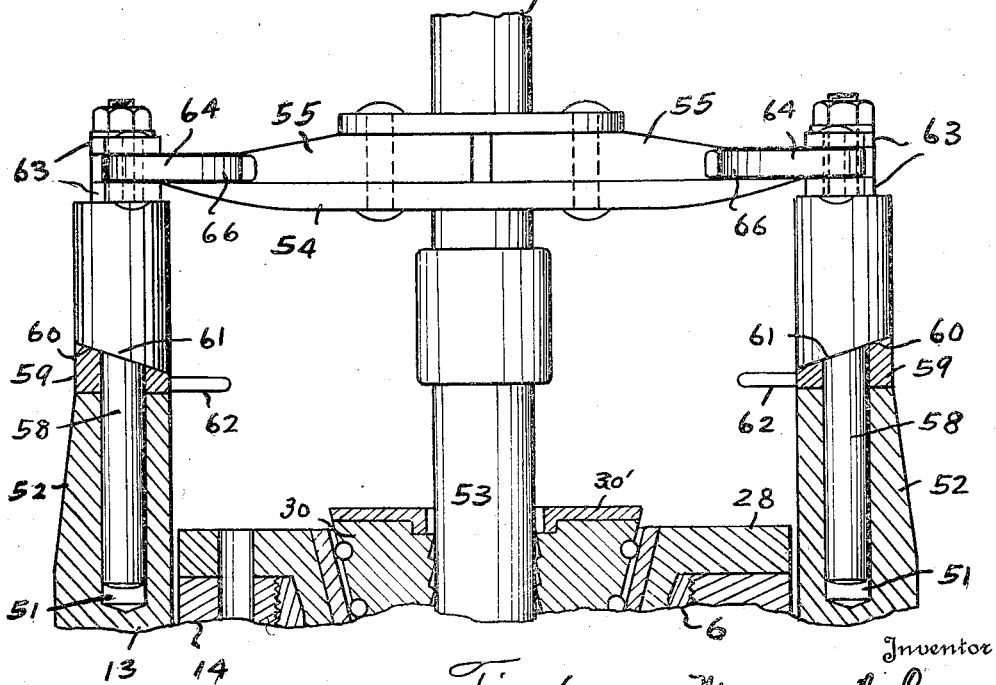
Figure 6 shows a fragmentary vertical sectional view of the apparatus equipped for screwing together or unscrewing and separating adjacent joints of the pipe.

The slip cages 30' are provided with the pivotally mounted dogs 44, whose upper free ends are outwardly turned and work through the slots 45 in said slip cages and are held in projected position and aligned above the upper ends of the lift bars 38 by means of the outwardly operating springs 46 which work against said dogs. When the bars 38 are lifted, as described, they engage said dogs and lift the slip cages 30' to carry the slips 30 out of pipe engaging position and they may be held in such position by engaging the latch 42 over the catch 43, all of which is shown in Figure 2.

When the latch is disengaged from said catch the slips will drop into pipe engaging position.

When it is desired to rotate the drill stem in drilling a yoke, as 47, is mounted on the master wheel, said yoke having a central polygonal opening or bearing 48 provided to receive the grief joint 49 which forms the upper end of said drill stem. The ends of this yoke 47 are connected to the driving standards 50, 50, which are fitted into deep sockets 51, 51 in the anchors 52, 52, upstanding from the master wheel. While drilling the slip cages 30' are held in upper or released position.

It is sometimes desirable to make up, or break out, the drill stem or other pipe and in such cases the slip cages 30' are released and permitted to drop to carry the slips into pipe engaging position to hold the string of pipe 53 suspended in the bore as well as to hold the same against turning. A double acting tong, hereinafter described, is then mounted on the wheel, as hereinafter explained, and engaged with the upper joint of said pipe to be connected onto, or broken out of, the string and by rotating the wheel this upper joint may be turned. While this upper joint is thus being rotated the string of pipe beneath will be held against rotation and suspended in the bore by the pipe holder in the stationary sleeve 6.

This double acting tong includes an arcuate yoke 54 having the oppositely disposed confronting, pipe-engaging jaws 55, 55, pivoted thereto, the opposite ends 56, 56, of said jaws being extended across said yoke and outwardly turned. The outer ends of the yoke have the elongated, transverse bearings 57, 57, provided to receive the upper ends of the driving standards 58, 58, whose lower ends are fitted into sockets 51, of the master wheel. Mounted on the upper end of the anchors 52 and turnable on said standards 58 are the bearing rings 59, 59, whose upper faces are sloping, forming the cams 60, 60, which work against similar, reversely disposed cam faces 61, 61, carried by said standards 58 and the bearing rings 59 carry the handles 62, 62, by means of which they may be turned to elevate or lower the standards 58 and thereby to adjust the tong relative to the master wheel. When the pipe is being made up the rings 59 are turned so as to elevate the tong to upper position and it is then applied to the joint to be screwed onto the string and said rings are then turned to permit the tong to move downwardly relative to the master wheel as the threads are screwed up.

The outer ends 56 of the jaws 55 work between the respective links 63, 63, which are mounted at their inner ends on the upper ends of the corresponding standards 58. Pivoted between the outer ends of the respective pairs of links, and operable against the outer ends 56 of the jaws 55, are the cams 64 adapted to be engaged with or released from said ends 56 of said jaws 55. When so engaged they operate to hold the jaws 55 in engagement with the upper joint of the pipe 53 so that said joint will be turned as the master wheel is turned. When it is desired to release the jaws 55 from said joint of pipe the cams 65 may be swung around, through their handles 66 and the cams 65 released which will permit the release of the jaws 55 from the pipe.

It is to be observed that neither during the operation of drilling, nor of making up or breaking out the pipe is there any substantial load on the master wheel bearings, since the weight of the pipe is carried by the supporting sleeve 6 while said pipe is being broken up or screwed together and during drilling operations the only weight of the pipe transmitted to the master wheel, is that transmitted by reason of the friction of the grief pipe 49 within the yoke 47.

It is further to be noted that the sleeve 6 forms an anchor, as well as a bearing, for the master wheel and prevents any side movement, or wabbling of the master wheel, relative to the base plate.

Provision of the pipe holder, as described, together with the means for releasing the same from the pipe and applying the same to a pipe, all in combination with the rotary constitutes a practical type of well boring apparatus for the reason that should the string of pipe for any reason become disengaged from the hoisting apparatus while elevating or lowering said pipe, the holder can be very quickly released to drop into pipe engaging position and thus made to engage the descending string of pipe before any considerable damage is done by the elevator or hoist block coming into contact with the rotary.

What I claim is:—

1. In a well boring apparatus including a base plate having a pipe receiving opening, an upstanding sleeve carried by the base plate formed with a radial bearing, and surrounding said opening, an annular upstanding rim carried by the base plate and formed with a radial stuffing box and spaced from said sleeve and forming a lubricant retainer between them, bearings in said retainer a master wheel having gear teeth and mounted on said bearings, a shaft working through said stuffing box and having its inner end journaled in said radial bearing and a gear on said shaft in mesh with said gear teeth.

2. A well boring apparatus including a support having a pipe receiving opening, an upstanding sleeve carried by the support and formed with a radial bearing and surrounding said opening, an annular upstanding rim carried by the support and formed with a radial stuffing box and spaced from said sleeve and forming a lubricant retainer between them, bearings in said retainer a master wheel having gear teeth and mounted on said bearings, and closely surrounding said sleeve, a shaft working through said stuffing box and having its inner end journaled in said radial bearing and a gear on said shaft in mesh with said gear teeth.

3. A well boring apparatus including a base plate having a pipe receiving opening, an upstanding sleeve carried by the base plate and surrounding said opening, an annular upstanding rim carried by the base plate and spaced from said sleeve and forming a lubricant retainer between them, bearings in said retainer and a master wheel mounted on said bearing, a drive shaft extending through said rim and whose inner end is journaled in said sleeve, said shaft having an operative connection with said masterwheel, said rim and master wheel being formed, one with an annular groove and the other with an annular projection which fits into said groove.

4. A well boring apparatus including a base plate having a pipe receiving opening, an annular upstanding sleeve carried by the base plate and surrounding said opening, an annular upstanding rim carried by the base plate and spaced from said sleeve to form a channel between them, a master wheel surrounding said sleeve and enclosing said channel, a drive shaft which extends through the rim and whose inner end is journaled in said sleeve and the pinion on said shaft and in mesh with said master wheel.

5. A well boring apparatus including a base plate having a pipe receiving opening, an annular upstanding sleeve carried by the base plate and surrounding said opening, an annular upstanding rim carried by the base plate and spaced from said sleeve to form a channel between them, a master wheel surrounding said sleeve and enclosing said channel, bearings enclosed within said channel on which the master wheel rides, a drive shaft which extends through the rim and whose inner end is journaled in said sleeve and the pinion on said shaft and in mesh with said master wheel.

6. A well boring apparatus including a base plate having a pipe receiving opening, an annular upstanding sleeve carried by the base plate and surrounding said opening, an annular upstanding rim carried by the base plate and spaced from said sleeve to form a channel between them, a master wheel surrounding said sleeve and enclosing said channel, bearings enclosed within said channel on which the master wheel rides, a ring nut on said sleeve adapted to retain the master wheel on said bearings, a drive shaft operatively connected with the master wheel and working through a bearing in said rim and whose inner end is journaled in said sleeve.

7. A well boring apparatus including a base plate having a pipe receiving opening, an annular upstanding sleeve having a radial bearing, carried by the base plate and surrounding said opening, an annular upstanding rim carried by the base plate and having a radial stuffing box and spaced from said sleeve to form a channel between them, a master wheel surrounding said sleeve and enclosing said channel, a shaft working through said stuffing box and whose inner end is journaled in said radial bearing and a driving member fixed on said shaft and enclosed within said channel and operatively connected with said master wheel and adapted to rotate the same.

8. A well boring apparatus including a support having a pipe receiving opening and having an annular channel around said opening, a master wheel mounted on said support and enclosing said channel, bearings enclosed within the channel on which the master wheel rides, a shaft working through said rim and whose inner end is journaled in said sleeve and a driving member enclosed within the channel fixed on said shaft and operatively connected with and adapted to drive said master wheel.

9. A well boring apparatus including a base plate having a pipe receiving opening said plate also having an annular channel surrounding said opening, a master wheel mounted to rotate on said base plate, a driving shaft working through a bearing in the outer wall of the channel and whose inner end is journaled in the inner wall of the channel and means forming a driving connection between said shaft and master wheel.

In testimony whereof I have signed my name to this specification.

MONROE W. CARROLL.